United States Patent [19]

Leader

[11] 3,837,158
[45] Sept. 24, 1974

[54] GRASS CATCHER FOR ROTARY MOWER
[76] Inventor: Joe Leader, 915 West 34th St., Minneapolis, Minn. 55426
[22] Filed: July 9, 1973
[21] Appl. No.: 377,787

[52] U.S. Cl. ............................................. 56/202
[51] Int. Cl. ........................................ A01d 35/22
[58] Field of Search ............ 56/202, 203, 204, 205, 56/206, 194, 201; 171/23

[56] References Cited
UNITED STATES PATENTS

| | | | |
|---|---|---|---|
| 1,975,668 | 10/1934 | Rodin | 171/23 |
| 2,855,745 | 10/1958 | Phelps | 56/202 |
| 3,002,332 | 10/1961 | Shane | 56/203 |
| 3,014,330 | 12/1961 | Oberdick | 56/202 |
| 3,108,420 | 10/1963 | Gercke | 56/205 |

Primary Examiner—Antonio F. Guida
Attorney, Agent, or Firm—Schroeder, Siegfried, Ryan & Vidas

[57] ABSTRACT

Shown herein is a generally diamond-shaped container having a divider member pivotally mounted within its inlet and cooperating with an upwardly extending deflector at the bottom to direct the grass clippings from the discharge of a rotary mower to the more remote portions of the container. A handle member adjacent the inlet also serves to attach the container to the rotary mower in receiving relation.

11 Claims, 7 Drawing Figures

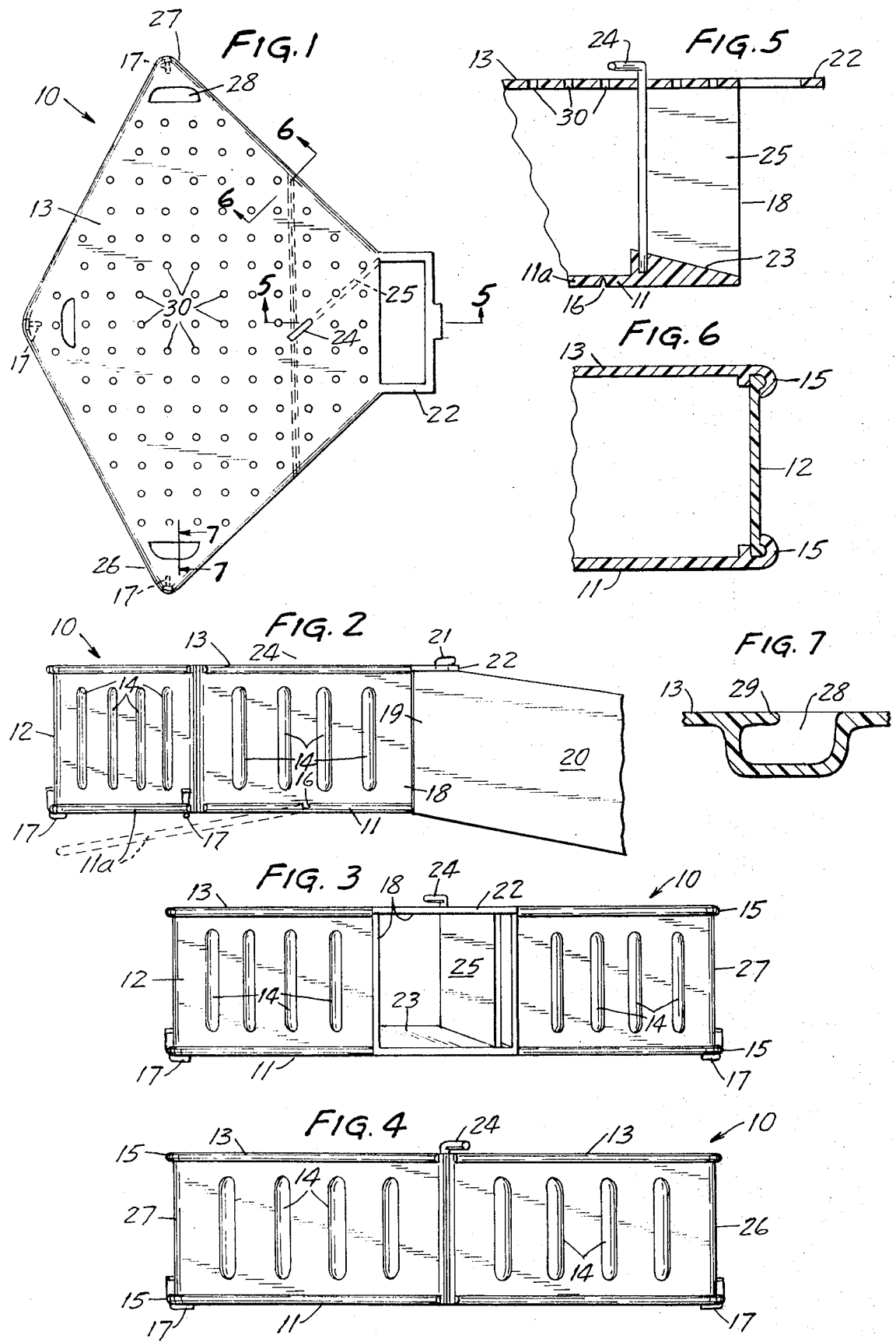

GRASS CATCHER FOR ROTARY MOWER

This invention relates to grass catchers for rotary lawn mowers.

It is the general object of the invention to provide a novel and improved grass catcher for rotary lawn mowers of simple and inexpensive design and construction. Another object is to provide a grass catcher for a rotary lawn mower which has a unique design constructed to enable the operator of the mower to require a minimum of width within which the machine may operate.

Another object is to provide a grass catcher for a rotary lawn mower the effective capacity of the container of which is increased because of the construction thereof.

Another object is to provide a grass catcher for a rotary lawn mower which is constructed so as to make the maximum use of the interior space thereof.

These and other objects and advantages of my invention will more fully appear from the following description, made in connection with the accompanying drawings, wherein like reference characters refer to the same or similar parts throughout the several views, in which:

FIG. 1 is a top plan view of a grass catcher embodying my invention;

FIG. 2 is a front end view thereof with the grass catcher shown in a diagrammatic manner attached to the discharge defining portions of a rotary lawn mower;

FIG. 3 is a side view of my grass catcher looking into the inlet thereof;

FIG. 4 is a side elevational view thereof taken from the opposite side of that shown in FIG. 3;

FIG. 5 is a vertical view taken along line 5—5 of FIG. 1;

FIG. 6 is a vertical sectional view taken along line 6—6 of FIG. 1; and

FIG. 7 is a fragmentary vertical sectional view taken through the top wall of the grass catcher along line 7—7 of FIG. 1.

As shown in FIGS. 1-7, my grass catcher may include a container indicated generally by the numeral 10 which has a bottom member 11, side walls 12 and a top wall 13. The side walls may be ribbed as at 14 to provide added strength. The bottom 11 and side walls 12 and top wall 13 may each, if desired, be formed of plastic material to facilitate manufacture and, if so desired, may be provided with interlocking snap attachments as at 15 to assemble these members as shown so as to form the container 10. The bottom 11 has a swingable portion 11a which swings about a break line 16 which consists merely of a line reduced thickness to facilitate the downward swinging movement of the portion 11a. This portion 11a is secured at each of the sides by snap members such as indicated by the numeral 17. The portion 11a is swung to open position to facilitate emptying the container 10 after it has become loaded with grass clippings, and is thereafter swung to closed position and retained by the elements 17 in such position while the container is attached to the rotary mower in receiving relation.

As best shown in FIGS. 1 and 3, of one of the obtuse angles of the generally diamond-shaped container 10 is provided with an inlet 18 which is adapted to be secured in receiving relation to the discharge outlet 19 of a rotary lawn mower housing 20 which is shown diagrammatically only in FIG. 2. The housing 20 is provided with an upstanding hook member 21 which is adapted to cooperate with a handle member 22 carried by the top wall 13 as best shown in FIGS. 1 and 5. To attach the container to the housing 20, the handle member 22 is placed over the hook member 21 and when the container is permitted to move downwardly, the portions of the side walls 12 and the bottom 11 which define the inlet bear against the discharge defining portions 19 of the rotary mower 20 so as to support the container.

The portions of the bottom wall 11 adjacent to and defining the inlet 18, slope upwardly and inwardly as best shown in FIG. 5. These portions have been identified by the numeral 23. Pivotally mounted within the top wall 13 and the deflector member 23 is pivot rod 24 which pivots about its vertical axis and swings a divider member 25 which is attached thereto between the opposite sides of the inlet 18. For example, as viewed in FIG. 3, the divider member 25 may be swung from right to left or vice versa depending on whether it is desired to direct the flow of grass clippings toward the forward end portion 26 of the container, or to the more rearward portions identified by the numeral 27.

FIG. 7 shows recess defining portions 28 in the top wall 13 which facilitate handling of the container 10 and emptying the same as desired. An overhanging lip 29 facilitates grasping and holding the container during the emptying operation in which the portions 11a of the bottom wall are swung free to facilitate the emptying operation.

In use the container 10 is attached to the housing 20 by hooking the handle member 22 over the hook 21 and permitting the container to be lowered to the position shown in FIG. 2. The grass clippings from the rotary mower may be directed either forwardly or rearwardly as desired, by manually swinging the divider member 25 to the desired position so as to accomplish same. The upper deflection of the deflector 23 gives the grass clippings an upwardly direction to insure that it will be carried to the more remote portions of the container 10, either forwardly or rearwardly depending upon the position to which the divider member 25 has been swung. The air flow, which is generated by the rotary mower and carries the grass clippings into the remote portions of the container 10, is permitted to escape through the perforations indicated by the numeral 30 in FIG. 1 of the top wall 13.

It will be noted that the extent of lateral extension of the container 10 is reduced to a minimum through the use of the generally diamond shape of the container 10. The divider member 25 insures that the grass clippings will be carried to the more remote portions of the container, and thus one of the most serious objections leveled at grass catchers, namely the need for an excessive and repeated emptying of the container because the same fills only partially before plugging the inlet, has been obviated. The grass catcher shown herein functions to utilize the interior space of the grass catcher to the maximum to thereby substantially reduce the frequency of the need for emptying the grass catching container during the mowing operation.

The grass catcher as shown can be utilized in conjunction with a lawn mower such as has been shown in many prior patents, as for example, U.S. Pat. No.

2,970,421, with only the discharge portion thereof modified as shown in FIG. 2 hereof.

It will, of course, be understood that various changes may be made in the form, details, arrangement and proportions of the parts without departing from the scope of my invention which consists of the matter shown and described herein and set forth in the appended claims.

I claim:
1. A grass catcher comprising:
    a. a generally diamond shaped container having a bottom and having side wall and top wall members and having two pair of opposed apexes, one pair of which is disposed more closely adjacent to each other than the other pair,
    b. at least one of said wall members being perforated to permit air to pass outwardly therethrough while retaining grass clippings therewithin,
    c. said container having an inlet disposed at one of its said more closely disposed apexes adapted to register with the discharge outlet of a rotary mower housing in receiving relation thereto,
    d. said container being constructed and arranged for attachment to such a mower housing to hold the inlet of said container in such receiving relation.
2. The structure defined in claim 1 and a vertically extending pivotally mounted divider member disposed within said container adjacent said inlet and swingable thereacross about a vertical axis from adjacent one side of the inlet toward and adjacent the other.
3. The structure defined in claim 1 and a deflector member disposed within said container opposite said inlet and extending thereacross, said deflector member extending upwardly and inwardly from said bottom adjacent said inlet.
4. The structure defined in claim 1 and means carried by said container adjacent said inlet for attaching the same to such a rotary mower housing.
5. The structure defined in claim 1 and a ring-like handle member carried by said container adjacent said inlet for attaching the same to such a rotary mower housing and for facilitating the emptying of said container.
6. The structure defined in claim 1 and a divider member within said container extending between said bottom and said top wall member adjacent said inlet, said divider member being swingably mounted for swinging movement from one side to the other of said inlet to direct the discharge of such a mower housing when so attached thereto to either the forward or rearward portions of said container as desired.

7. the structure defined in claim 1,
    e. a rotary mower housing having a laterally disposed discharge outlet thereon, and
    f. means carried by said mower housing for securing said container thereto with the inlet of the latter in registering and receiving relation to the discharge outlet of said mower housing.
8. The structure defined in claim 1 wherein said container bottom is flexible adjacent said inlet along a line generally parallel to the longitudinal axis of said container and is swingable downwardly thereat to facilitate emptying grass clippings from said container.
9. The structure defined in claim 1 wherein said container has forwardly and rearwardly disposed opposite apexes relative to said inlet,
    e. the distance from said inlet to the opposite apex of said container being substantially less than the distance between said forwardly and rearwardly disposed apexes, and
    f. a divider member mounted within said container and extending vertically between said bottom and said top wall member adjacent said inlet and being swingably mounted for swinging movement across said inlet to alternatively direct grass clippings toward either said forward or rearward apex of said container as desired.
10. A grass catcher comprising:
    a. a container having a bottom and having side and top wall members and being generally diamond shaped when considered in horizontal section,
    b. at least one of said members being perforate to permit air to pass outwardly therethrough while retaining grass clippings therewithin,
    c. said container having an inlet disposed adjacent the apex of one of the obtuse angles thereof and adapted to register with the discharge outlet of a rotary mower housing in receiving relation thereto,
    d. said container being constructed and arranged for attachment to such a mower housing to hold the inlet thereof in such receiving relation.
11. The structure defined in claim 10, and a diver member disposed within said container and being swingably mounted for swinging movement about a vertical axis from adjacent one side of said inlet toward and adjacent the other side thereof to direct as desired the discharge of such a mower housing when so attached thereto toward either of the apexes adjacent the acute angles of said container.

* * * * *